United States Patent [19]

Voisine

[11] Patent Number: 4,927,444
[45] Date of Patent: May 22, 1990

[54] PUSHER MECHANISM FOR GLASS FORMING MACHINE

[75] Inventor: Gary R. Voisine, Windsor, Conn.

[73] Assignee: Emhart Industries, Inc., Towson, Md.

[21] Appl. No.: 402,956

[22] Filed: Sep. 5, 1989

[51] Int. Cl.$^5$ .............................................. C03B 35/10
[52] U.S. Cl. ...................................... 65/323; 65/348; 65/375; 198/468.01; 198/493
[58] Field of Search ................. 65/158, 165, 239, 241, 65/260, 323, 348, 375; 198/468.01, 493, 740; 414/744.2, 744.6, 755

[56] References Cited

U.S. PATENT DOCUMENTS 4,409,013 10/1983 Cardenas et al. ...................... 65/163
4,462,519 7/1984 Parkell et al. ................... 198/468.01

Primary Examiner—Joye L. Woodard
Attorney, Agent, or Firm—Spencer T. Smith

[57] ABSTRACT

An air conduit is carried by each pocket of a ware handling device to direct air under pressure towards the corner of the pocket which is to receive a container. The source is cylinder air which is fed through a hole in this piston/rod to the ware handling arm.

5 Claims, 2 Drawing Sheets

4,927,444

PUSHER MECHANISM FOR GLASS FORMING MACHINE

BACKGROUND OF THE INVENTION

The present invention relates to machinery for manufacturing glass containers, and specifically, to pusher mechanisms which transfer glass containers deposited on a dead plate of an individual section machine to a moving conveyor which will deliver the containers to a lehr.

In state of the art multi-container pushers, a pneumatic cylinder extends a container handling arm, having a plurality of L-shaped pockets, to a container receiving location. Formed containers are deposited proximate these pockets on a dead plate and air under pressure is directed toward the containers by a pocket air distributor secured to the dead plate opposite the container handling arm to blow the containers fully into their pockets.

SUMMARY OF THE INVENTION

It is an object of the present invention to provide a mechanism which will more rapidly locate the containers in their pockets and which maintain them so located during rotational displacement of the pusher as it transfers the containers from the dead plate to the conveyor.

Other objects and advantages of the present invention will become apparent from the following portion of this specification and from the accompanying drawings which illustrate in accordance with the mandate of the patent statutes, a presently preferred embodiment incorporating the principles of the invention.

DESCRIPTION OF THE PREFERRED EMBODIMENTS

Figure 1:
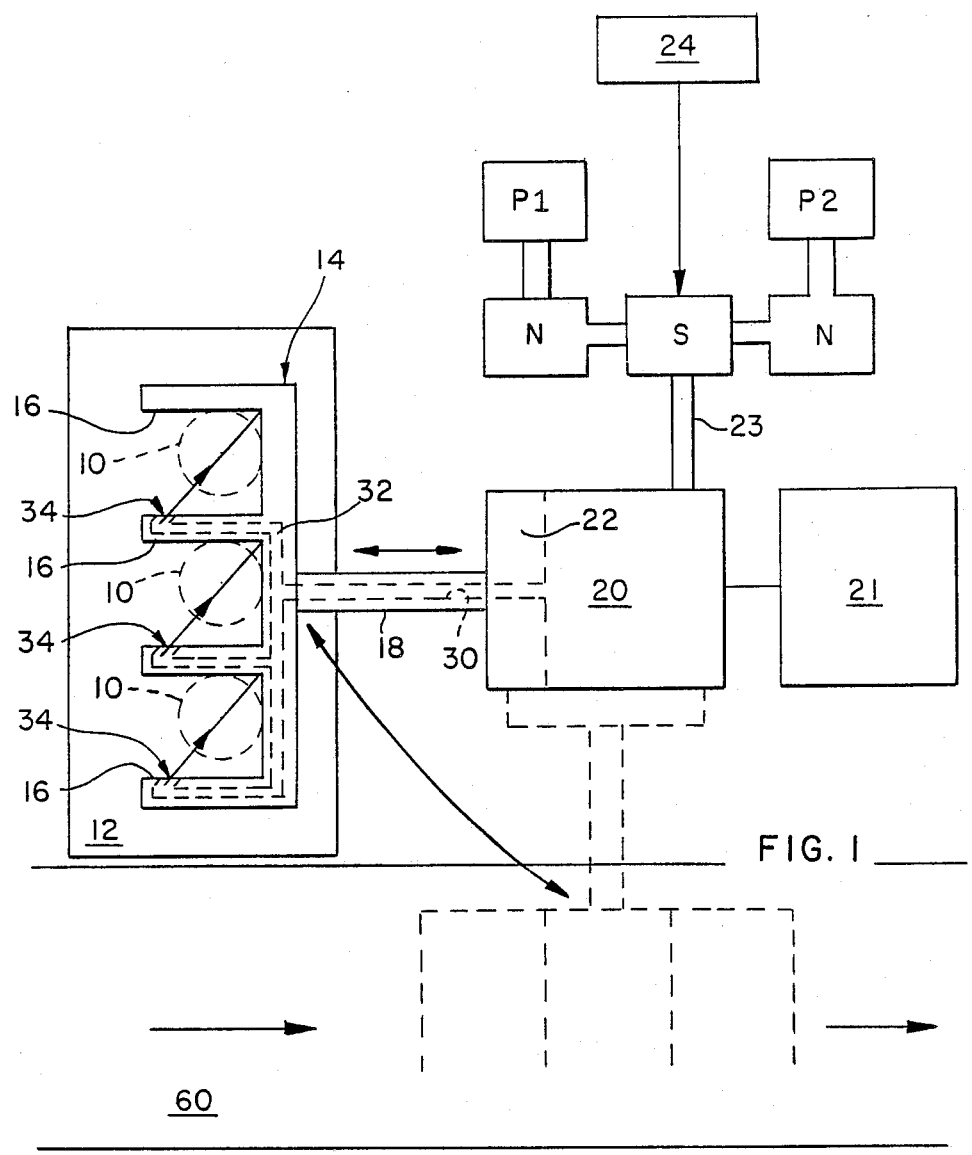
FIG. 1 is a schematic showing of a pusher mechanism made in accordance with the teachings of the present invention.
Figure 2:
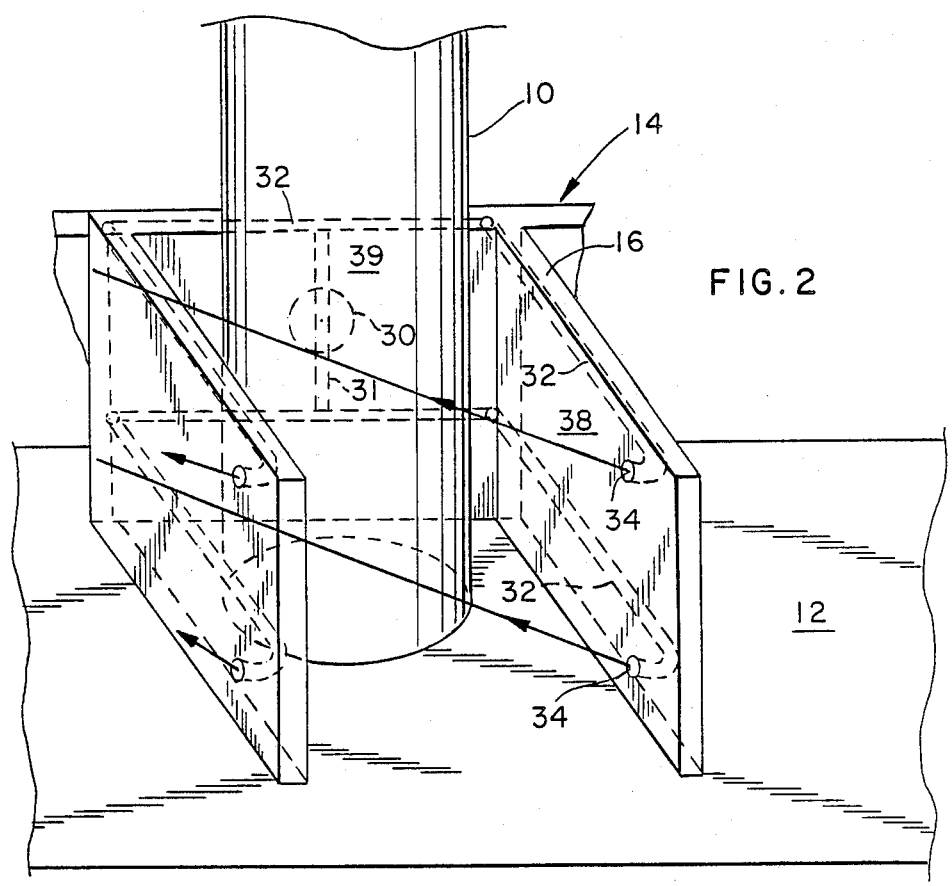
FIG. 2 is an oblique view of one of the container receiving pockets illustrated in FIG. 1.

A multi-gob individual section machine deposits a plurality (here three) of formed containers 10 on a dead plate 12. Prior to such placement, a ware handler 14 which has three U-shaped pockets 16 (there could be 1, 2, 3 or 4 such pockets) and which is secured to the rod 18 of the extend/retract pneumatic cylinder 20 is extended to the container receiving position by connecting extend air having a selected pressure P1 to the cylinder to displace the piston 22, and hence, rod 18. (Two-position selector switch S which is controlled by a machine controller 24 is set to one position connecting extend air P1 via the extend air line 23 to the cylinder 20). Generally, this pressure, which can be adjusted by changing the setting of a needle valve N is low (15 psi, for example) so that piston advance will be slow. When the ware handler 14 is fully advanced, the controller 24 switches the selector switch S to its second position connecting a second pressure source P2 (pocket air) to the extend line 23. This second pressure P2 is substantially higher (45 psi, for example) than extend air pressure and can also be adjusted via a needle valve N.

A conduit 30 extends through the piston 22 and rod 18, and communicates via distribution lines 31 with upper and lower air conduits 32 which are drilled into the side walls 38 and rear walls 39 of the ware handler 14. These conduits deliver air (either at extend pressure or pocket air pressure) to cylindrical openings 34 in the pocket side walls 38 which are aimed horizontally at the opposite corner of the pocket. Since these openings are small and the pressure is high, air will be discharged at a velocity high enough to locate the container fully in its pocket. The conduits 30, 31, 32 may be substantially larger in cross section than the cylindrical openings 34 to assure uniform pressure at these openings. Such locating of a container is assisted by the continuous surface of its U-shaped pocket. Pocket air will be turned on when the piston is fully advanced and turned off before completion of the transfer of the container to the conveyor 60. The cylinder is displaced through an arc to displace the ware handler from the dead plate 12 to the moving conveyor by a conventional mechanism illustrated as block 21 in FIG. 1.

Figure 3:
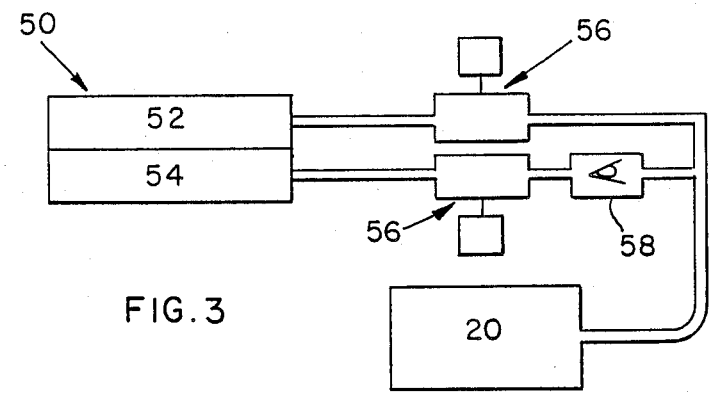
FIG. 3 is a schematic showing of an alternate arrangement for supplying air to the cylinder.

In an alternate arrangement (FIG. 3), air under pressure supplied from a single source is distributed by a distribution rack 50 having extend 52 and pocket air 54 connections. Both lines have a needle valve N to reduce the pressure as desired and the pocket air line additionally has a check valve since it is open to exhaust when extend air is applied.

I claim:

1. A pusher mechanism for transferring a selected number of containers from a dead plate of a glass forming machine to a conveyor comprising a container handling arm including a corresponding number of receptacles each having a container engaging corner, means for displacing said container handling arm from a retracted position to an advanced container receiving position and for displacing said advanced container handling arm from said receiving position through an arc to a deposit position on the conveyor, a corresponding number of conduit means displaceable with said container handling arm and selectively aimed to direct air discharged therefrom toward the corner of a respective one of said receptacles, and means for supplying air under pressure to said conduit means when said container handling arm is fully extended for locating each container in its associated corner.

2. A pusher mechanism according to claim 1 wherein each of said conduit means includes a pair of vertically spaced exit holes.

3. A pusher mechanism according to claim 2, wherein each of said container handling arm receptacles comprises continuous U-shaped wall means and said conduit means includes conduits defined within said wall means.

4. A pusher mechanism according to claim 3, wherein said displacing means comprises a cylinder having a movable piston and rod and said conduit means further comprises a hole extending axially through said piston and rod and manifold means in said container handling arm connecting said hole to each of said conduits defined in the container receptacles.

5. A mechanism for transferring at least one glass container from a pick up location to a deposit location comprising a container handling arm including a corresponding number of receptacles each having a container engaging corner,
means for displacing said container handling arm from said pick up location through an arc to said deposit location,
a corresponding number of conduit means displaceable with said container handling arm and selectively aimed to direct air discharged therefrom toward the corner of a respective one of said receptacles, and
means for supplying air under pressure to said conduit means for locating each container picked up at said pick up location in its associated corner and holding the container in its associated corner as the arm is displaced from said pick up location to said deposit location.

* * * * *